(12) United States Patent
Molina

(10) Patent No.: US 11,548,119 B2
(45) Date of Patent: Jan. 10, 2023

(54) SYSTEMS AND METHODS FOR A DUAL SIDED CLAMP

(71) Applicant: Gerardo Molina, Brazoria, TX (US)

(72) Inventor: Gerardo Molina, Brazoria, TX (US)

(*) Notice: Subject to any disclaimer, the term of this patent is extended or adjusted under 35 U.S.C. 154(b) by 402 days.

(21) Appl. No.: 16/579,932

(22) Filed: Sep. 24, 2019

(65) Prior Publication Data
US 2020/0094381 A1 Mar. 26, 2020

Related U.S. Application Data

(60) Provisional application No. 62/736,508, filed on Sep. 26, 2018.

(51) Int. Cl.
| | | |
|---|---|---|
| *B25B 5/00* | (2006.01) | |
| *B25B 5/14* | (2006.01) | |
| *B25B 5/10* | (2006.01) | |
| *G01C 9/28* | (2006.01) | |

(52) U.S. Cl.
CPC ............... *B25B 5/14* (2013.01); *B25B 5/003* (2013.01); *B25B 5/10* (2013.01); *G01C 9/28* (2013.01)

(58) Field of Classification Search
CPC ............... B25B 1/00; B25B 3/00; B25B 5/00
See application file for complete search history.

(56) References Cited

U.S. PATENT DOCUMENTS

| | | | |
|---|---|---|---|
| 3,599,960 A | 8/1971 | Phillips | |
| 4,445,678 A * | 5/1984 | George | B23Q 3/104 269/282 |
| 5,344,422 A | 9/1994 | Frigg | |
| 6,099,058 A * | 8/2000 | Asai | B25B 5/102 294/902 |
| 6,601,806 B2 | 8/2003 | Wing et al. | |
| 6,681,464 B1 * | 1/2004 | Dupuis | B25B 5/14 269/282 |
| 7,896,573 B2 | 3/2011 | Zaguroli | |
| 8,167,258 B1 | 5/2012 | Wentworth et al. | |
| 8,402,667 B2 | 3/2013 | Spaulding | |
| 2005/0120572 A1 | 6/2005 | Valenti | |
| 2006/0254190 A1 | 11/2006 | Hunt | |
| 2007/0284796 A1 * | 12/2007 | Hummel | B25B 5/142 269/41 |
| 2008/0271331 A1 | 11/2008 | Allemand | |
| 2009/0205214 A1 | 8/2009 | Wong | |

* cited by examiner

*Primary Examiner* — Lee D Wilson
(74) *Attorney, Agent, or Firm* — Pierson IP, PLLC

(57) ABSTRACT

Systems and methods for a dual sided clamp. More specifically, a clamp with a channel configured to receive a level on a first side of the clamp, and a triangular shaped cutout configured to receive a shaft associated with different sized valves on a second side of the clamp.

6 Claims, 4 Drawing Sheets

SYSTEMS AND METHODS FOR A DUAL SIDED CLAMP

BACKGROUND INFORMATION

Field of the Disclosure

Examples of the present disclosure are related to systems and methods for a dual sided clamp. More specifically, embodiments are directed towards a clamp with a channel configured to receive a level on a first side of the clamp, and a triangular shaped cutout configured to receive shafts associated with different sized valves on a second side of the clamp.

Background

A valve is a device that regulates, directs, or controls the flow of fluid, gases, etc. by opening, closing, or partially obstructing various passageways. Overtime, valves on a system need to be replaced, fixed, swapped, etc. This requires a new valve to be attached to the system. When attaching the new valve it is required that the valve is level with the existing system. If not, the valve may not be able to effectively open and close the passageways.

Conventionally to ensure that the new valve is attached to the system, fabricators position a level on a hand wheel of the valve after the valve is attached. The free standing level can then indicate the orientation of the valve. However, the hand wheel may not be straight or may have round parts that keep them from being completely level. This leads to situations where a valve may have to be reinstalled multiple times, or an installed valve may not be square plain level.

Accordingly, needs exist for more effective and efficient systems and methods for a clamp with a channel configured to receive a level on a first side of the clamp, and a triangular shaped cutout configured to receive shafts associated with different sized valves on a second side of the clamp.

SUMMARY

Embodiments disclosed herein describe systems and methods for a dual sided clamp. More specifically, embodiments are directed towards a clamp with a channel configured to receive a level on a first side of the clamp, and a triangular shaped cutout configured to receive shafts associated with a valve on a second side of the clamp.

The first side of the clamp may include a linear channel that is embedded within upper sidewalls, wherein the upper sidewalls extend vertically at a right angle on both sides of the channel. A first of the upper sidewalls may include a first coupling orifice, wherein the coupling orifice is configured to receive a coupling mechanism. In embodiments, a level or other tool may be configured to be positioned on the linear channel. The level may be secured in place by positioning the coupling mechanism, such as a bolt, through the coupling orifice. The level may then be positioned flush and adjacent to a second of the sidewalls.

The second side of the clamp may include a substantially triangular shaped cutout. The cutout may include lower sidewalls that extend towards the first side of the clamp and in inner surface. A first sidewall of the lower sidewalls may include a second coupling orifice, wherein the second coupling orifice is configured to receive a coupling mechanism. In embodiments, shafts with different sized diameters may be positioned within the cutout, and the coupling mechanism may be inserted through the coupling orifice to move the shaft towards an apex that is positioned opposite the first lower sidewall. This may enable different sized shafts to be positioned on the second side of the clamp.

In embodiments, the first sidewall and the second sidewall may be positioned on the same plane. This may enable a user to easily access the coupling mechanisms that interact with the level and the shafts on a same face of the clamp.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
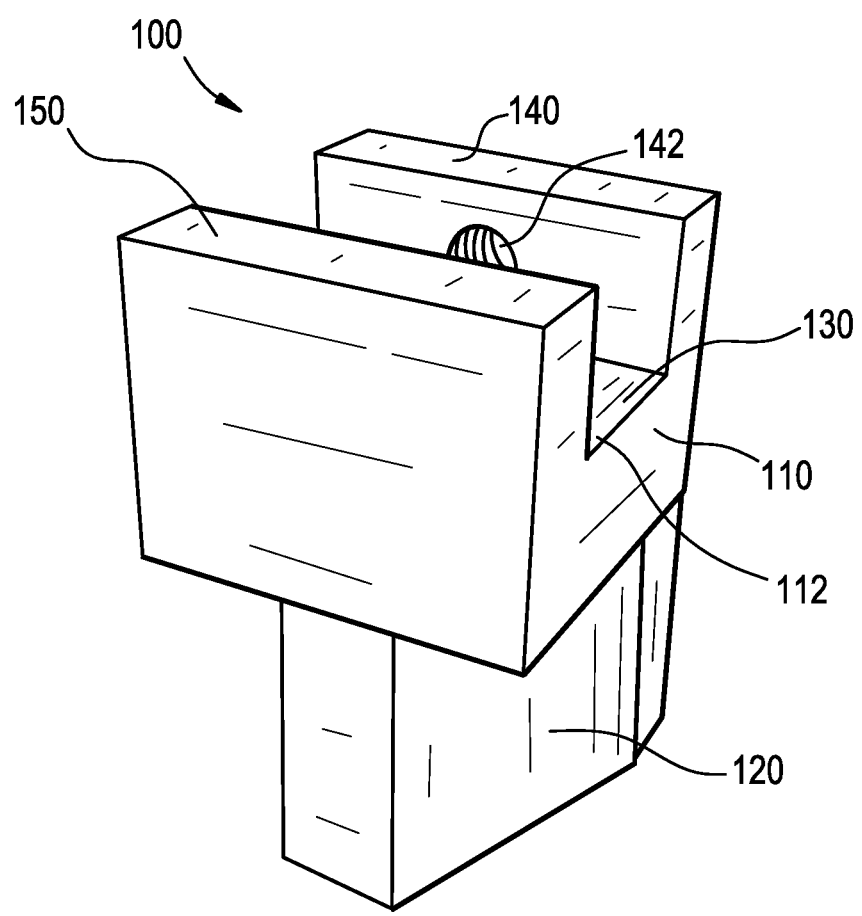
FIG. 1 depicts an upper perspective view of a clamp, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts an upper perspective view of a clamp 100, according to an embodiment. In embodiments, clamp 100 may include an upper side 110 and a lower side 120. Upper side 110 may be positioned on a proximal end of clamp 100, and lower side 120 may be positioned on a distal side of clamp 100.

Upper side 110 of clamp 100 may include a channel 130, a first upper sidewall 140, and a second upper sidewall 150.

Channel 130 may have a planar surface that extends from a first end 112 of first side 110 to a second end (not shown) of first side 110. As such, channel 130 may extend across the entirety of a width first side 110 of clamp 100. This may enable an object, such as a level, to be positioned flush on the planar surface of channel 130 without being obstructed along the width of first side 110. This may enable an object, such as a level, that has a longer width than channel 130 to be positioned within channel 130.

First upper sidewall 140 may be positioned on a first side of channel 130, and second upper sidewall 150 may be positioned on a second side of channel 130. First upper sidewall 140 and second upper sidewall 150 may extend away from channel in a direction that is perpendicular to the flush planar surface of channel 130. In embodiments, first upper sidewall 140 and second upper sidewall 150 may be the same heights and extend across the entirety of the width of channel 130. This may enable a front face and rear face of channel 130, first upper sidewall 130, and second upper sidewall 130 to be flush surfaces, wherein channel 130 is a square sized cutout.

First upper sidewall 140 may include a first coupling orifice 142. First coupling orifice 142 may extend through first upper sidewall, and may allow a first coupling mechanism, such as a bolt, screw, etc. to be inserted through first coupling orifice 142. In embodiments, the first coupling mechanism may be inserted through first coupling orifice and interact with the object, such as the level, positioned on channel 130. The first coupling mechanism may apply forces towards second upper sidewall 150, such that the object may be positioned directly adjacent to second upper sidewall 150 and secured in place. Responsive to the first coupling mechanism being loosened, the object may slide within channel 130 and/or removed from channel 130.

Figure 2:
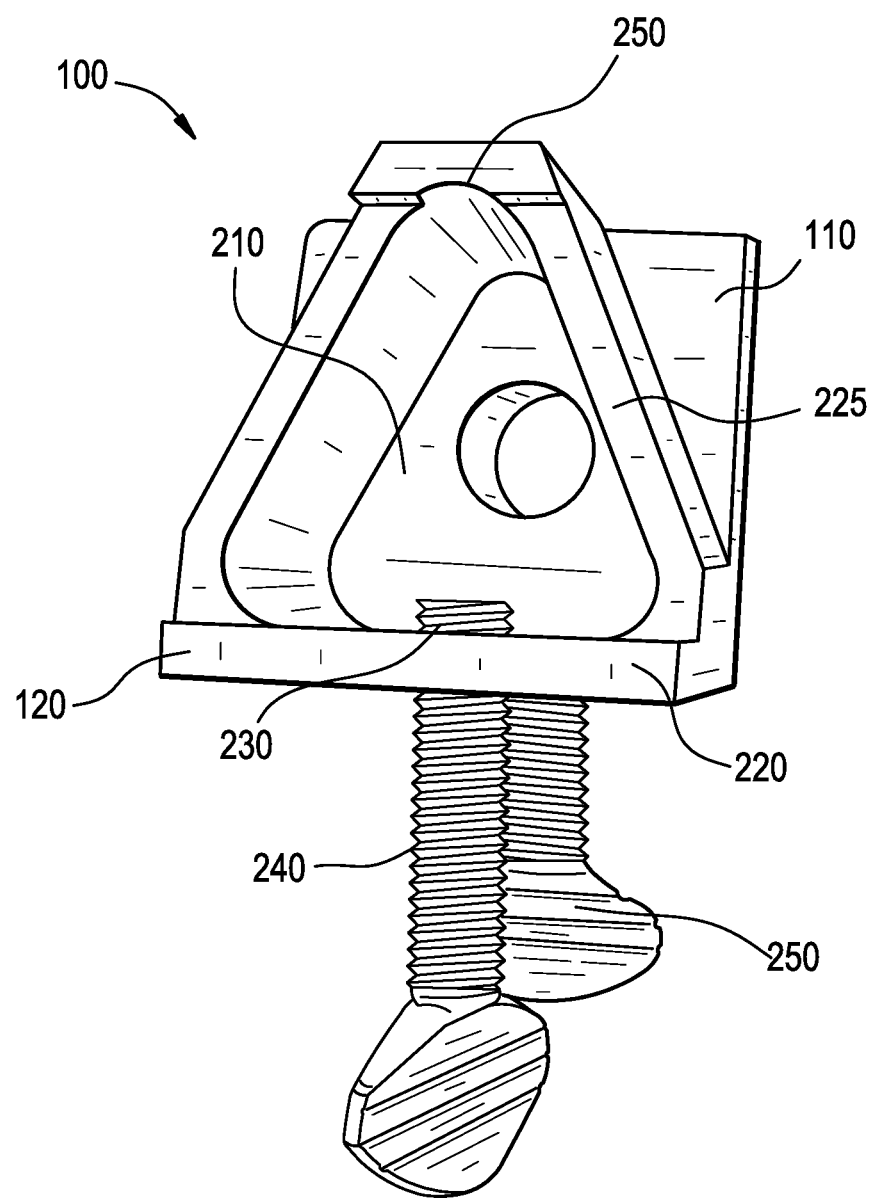
FIG. 2 depicts a bottom view of a clamp, according to an embodiment.

FIG. 2 depicts a bottom view of clamp 100, according to an embodiment. Specifically, FIG. 2 depicts Lower side 120 of clamp 100. Lower side 120 of clamp 120 may include a substantially triangular shaped cutout 210 that extends in a direction perpendicular to channel 130.

Cutout 210 may include a planar lower surface that is positioned in parallel to the planar lower surface of channel 130. This may enable a second object, such as a shaft, to be positioned adjacent and flush within second side 120 of clamp 120. Cutout 210 may include a plurality of sidewalls including a first lower sidewall 220 and angled sidewalls 225, and an apex 250 positioned on an opposite side of cutout 210 than first lower sidewall 220.

First lower sidewall 220 and angled sidewalls 225 may be projections extending away from the lower planar surface of cutout 210. First lower sidewall 220 may form a first side of the triangular cutout 210, wherein a width of cutout 210 is longest against cutout 210. Angled sidewalls 225 may extend from the edges of first lower sidewall 220 to apex 250 to decrease a width of cutout 210. Apex 250 may have a lip that extends away from the surfaces of angles sidewalls 225. The lip may assist in securing shafts within cutout 210.

In embodiments, shafts of different sizes may be configured to be positioned within cutout 210 and have a circumference that touches both angled sidewalls 225. Based on cutout 210 having varying widths, cutout 210 may accommodate different sized shafts.

A second coupling orifice 230 may be positioned through first lower sidewall 220. Second coupling orifice 230 may be configured to receive a second coupling mechanism 240. Second coupling mechanism 240 may be configured to be inserted through second coupling orifice 230 and interface with a circumference of the shaft positioned within cutout 210. Responsive to the second coupling mechanism 240 applying pressure against the shaft towards apex 250, the shaft may move towards apex and be secured in place within cutout 210.

Furthermore, first sidewall 140 and second sidewall 220 may be positioned on the same plane. This may enable a user to easily access both the first coupling mechanism 240 positioned through first coupling orifice 142 on first side 110 of clamp 110 and second coupling mechanism 240 positioned through second coupling orifice 230 on second side 120 of clamp 100 along a same face of the clamp 100. This positioning may enable shafts to be positioned closed to the center of cutout 210 when second coupling mechanism 240 is secures the shaft within cutout 210.

Figure 3:
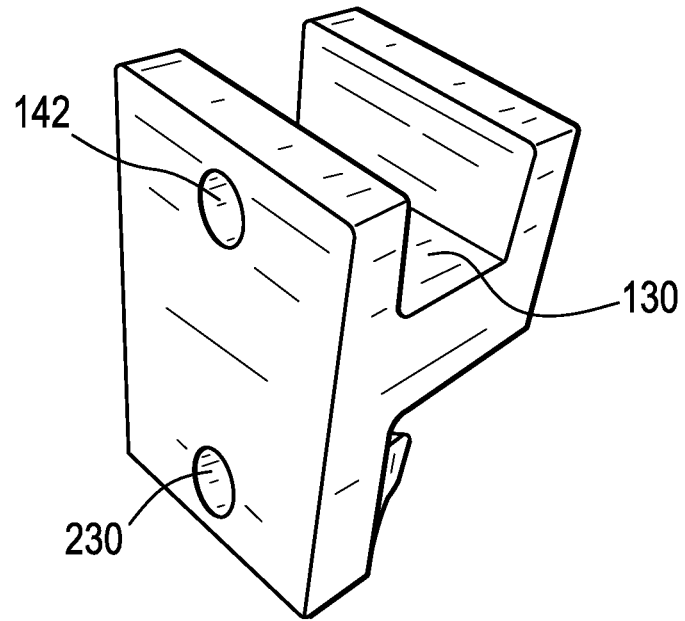
FIGS. 3 and 4 depict perspective views of a clamp, according to an embodiment.
Figure 4:
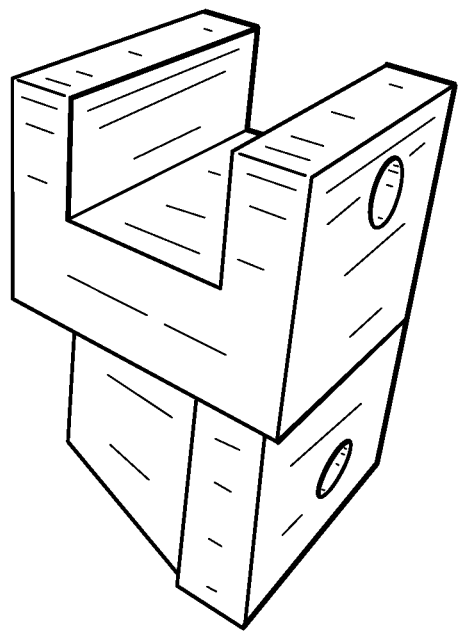

FIGS. 3 and 4 depict perspective views of clamp 100, according to an embodiment. As depicted, both first coupling orifice 142 and second coupling orifice 230 are positioned on the same face of clamp 100.

Furthermore, the FIGURES depicted channel 130 extending across a length of clamp 100.

Figure 5:
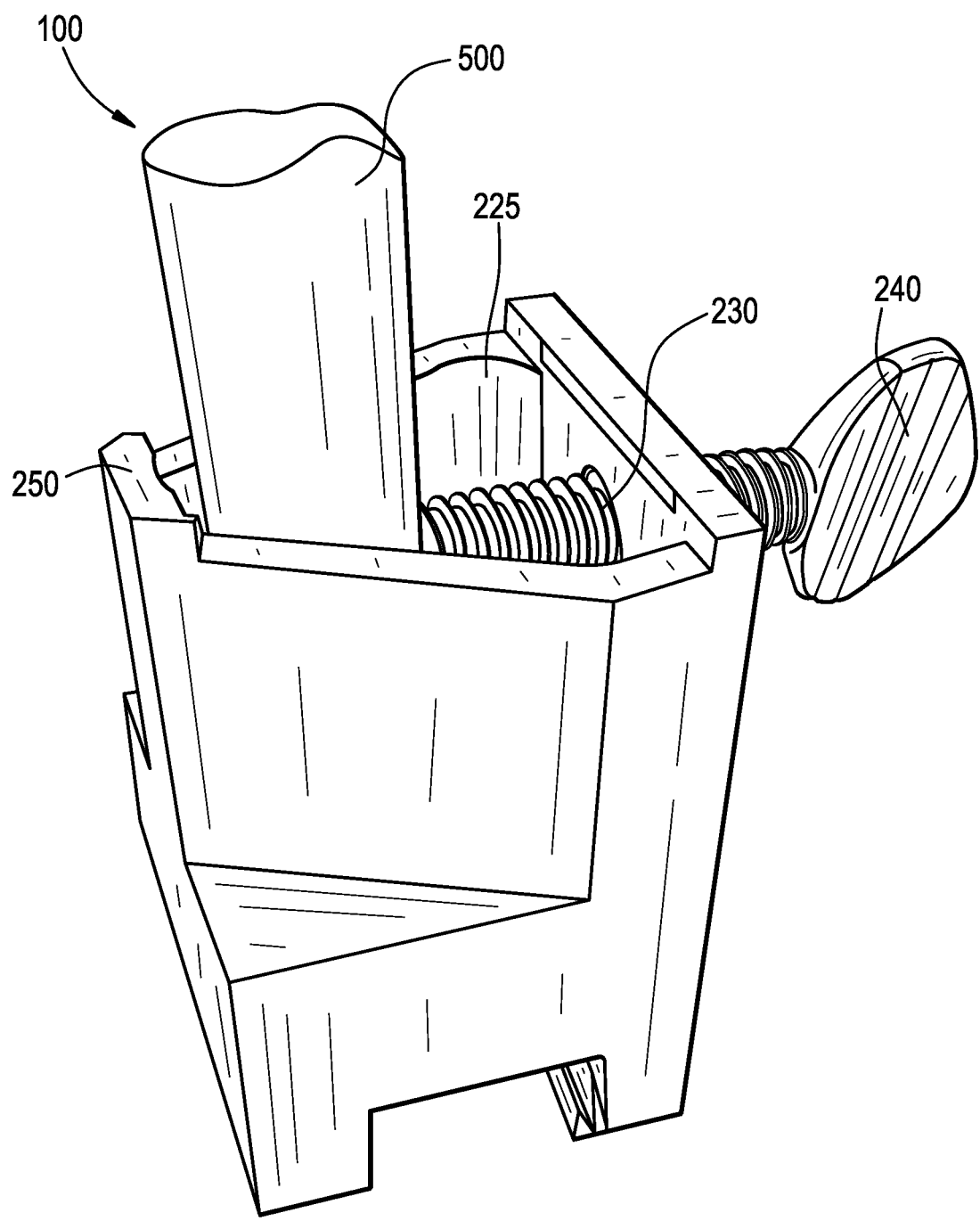
FIG. 5 depicts a lower view of a second side of a clamp, according to an embodiment.

FIG. 5 depict a lower view of second side 120 of clamp, according to an embodiment. As depicted in FIG. 5, responsive to positioning a shaft 500 without cutout 210, second coupling mechanism 230 may apply force against the circumference of shaft 500. This force may move shaft 500 to be positioned adjacent to apex and portions of angled sidewalls 225, wherein the positioning of shaft 500 may be based on a diameter of shaft 500.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A dual sided clamp comprising:
   a first side with a channel extending across an entire width of the first side, the channel being square in shape, the channel is defined by a first upper sidewall, a second upper sidewall, and a lower surface that extends between the first upper sidewall and the second upper sidewall, wherein the first upper sidewall includes a first coupling orifice that extends through the first upper sidewall;
   a second side with a triangular shaped cutout, the triangular shaped cutout extending in a direction perpendicular to the channel, wherein the triangular shaped cutout includes a first lower sidewall and two tapered sidewalls, the first lower sidewall being positioned co-planar with the first upper sidewall, wherein the first lower sidewall includes a second coupling orifice:
- a first coupling mechanism configured to be inserted into the first coupling orifice; and
- a second coupling mechanism configured to be inserted into the secondcoupling orifice.

2. The dual sided clamp of claim 1, wherein the triangular shaped cutout is substantially an isosceles shaped triangle.

3. The dual sided clamp of claim 1, wherein an apex of the two tapered sidewalls includes a lip, the lip increasing a height of the apex in comparison to the two tapered sidewalls.

4. The dual sided clamp of claim 1, wherein the two tapered sidewalls have a same length.

5. The dual sided clamp of claim 4, wherein the first lower sidewall is a different length then the two tapered sidewalls.

6. The dual sided clamp of claim 2, wherein internal angles of the triangular shaped cutout are rounded.

\* \* \* \* \*